M. BROCK.
LASTING MACHINE.
APPLICATION FILED JULY 19, 1898.
1,030,564.
Patented June 25, 1912.
10 SHEETS—SHEET 5.
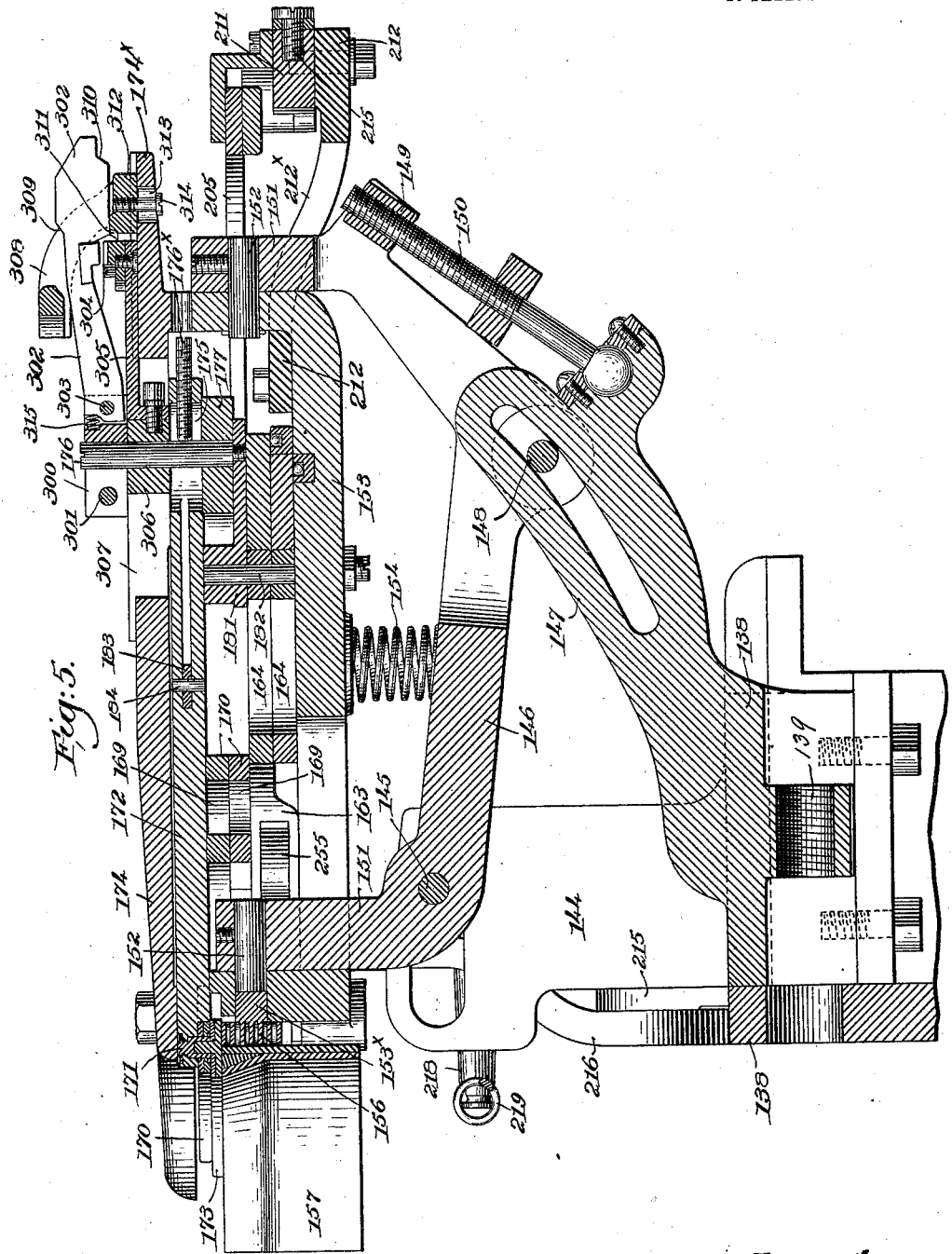
Witnesses.
Edward F. Allen
Fred S. Greenleaf
Inventor.
Matthias Brock.
by Crosby Gregory
attys.

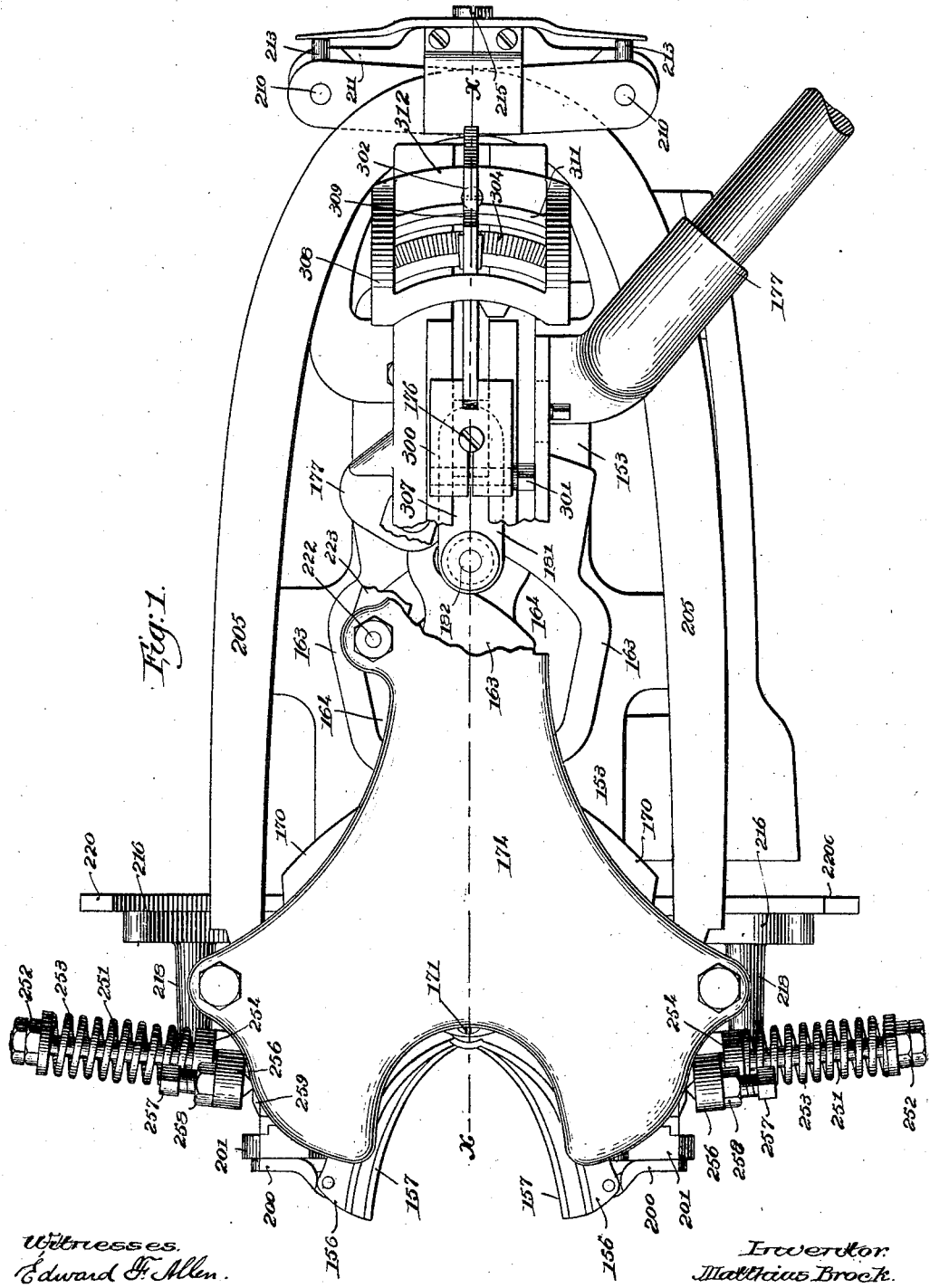

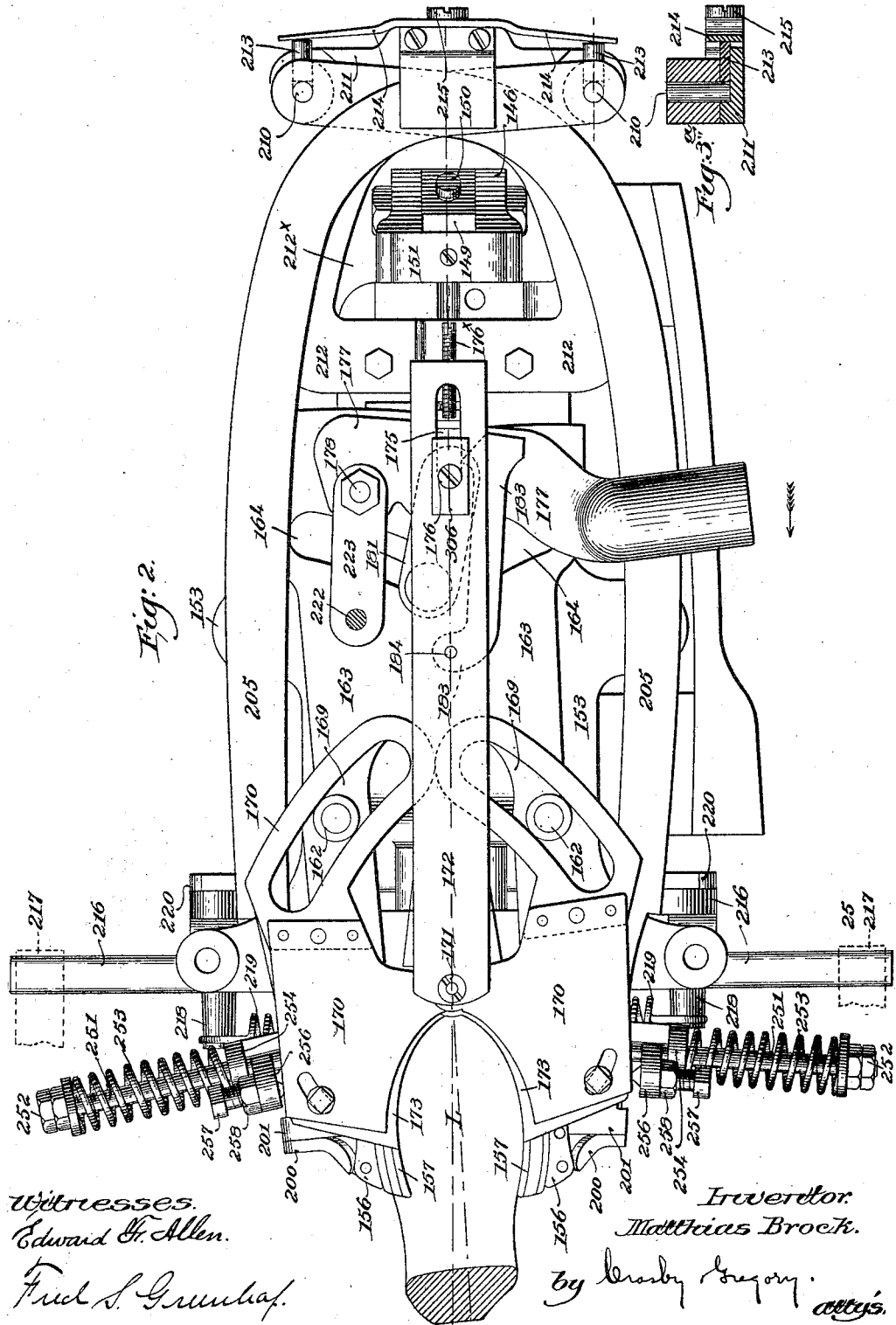

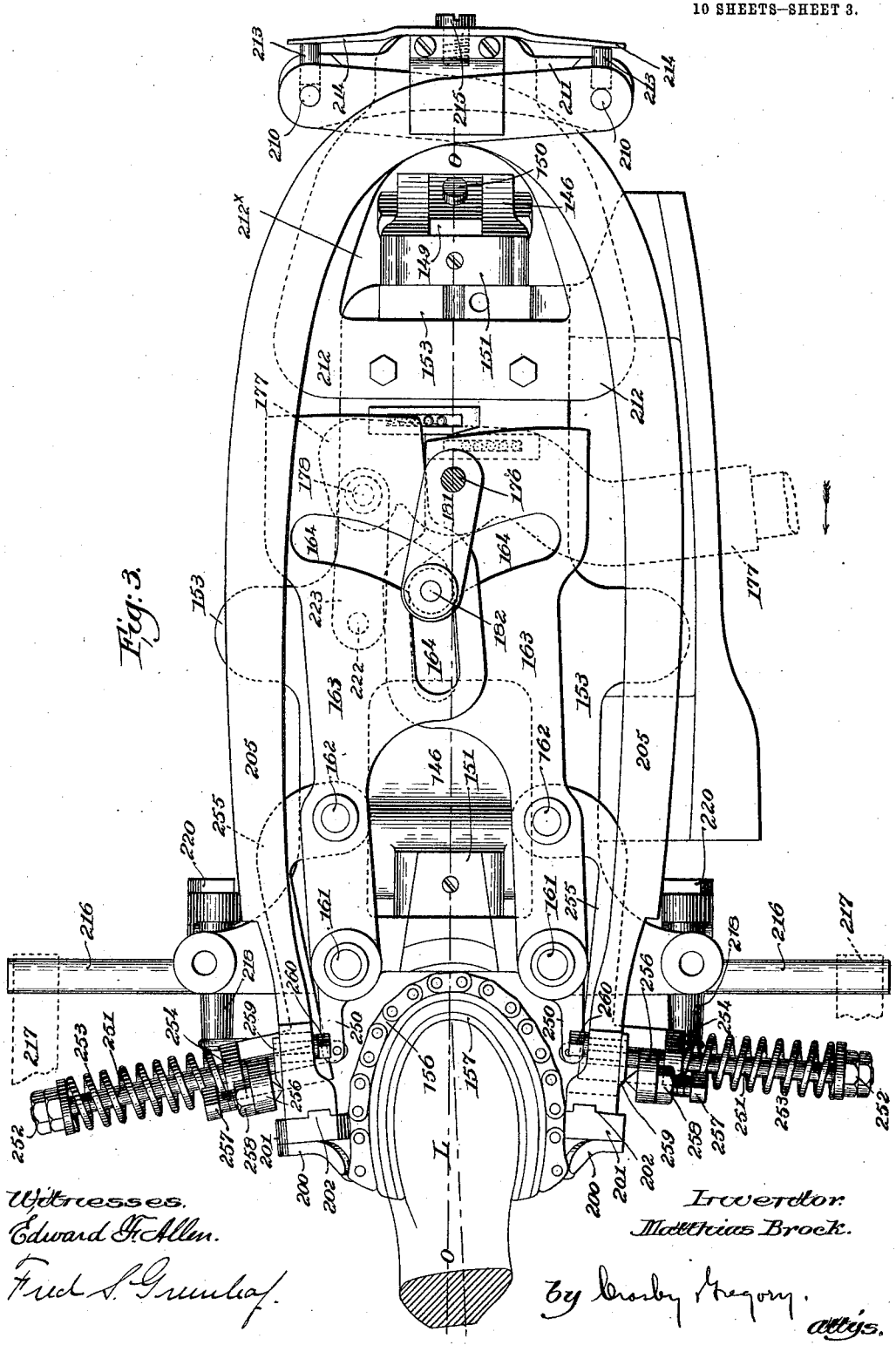

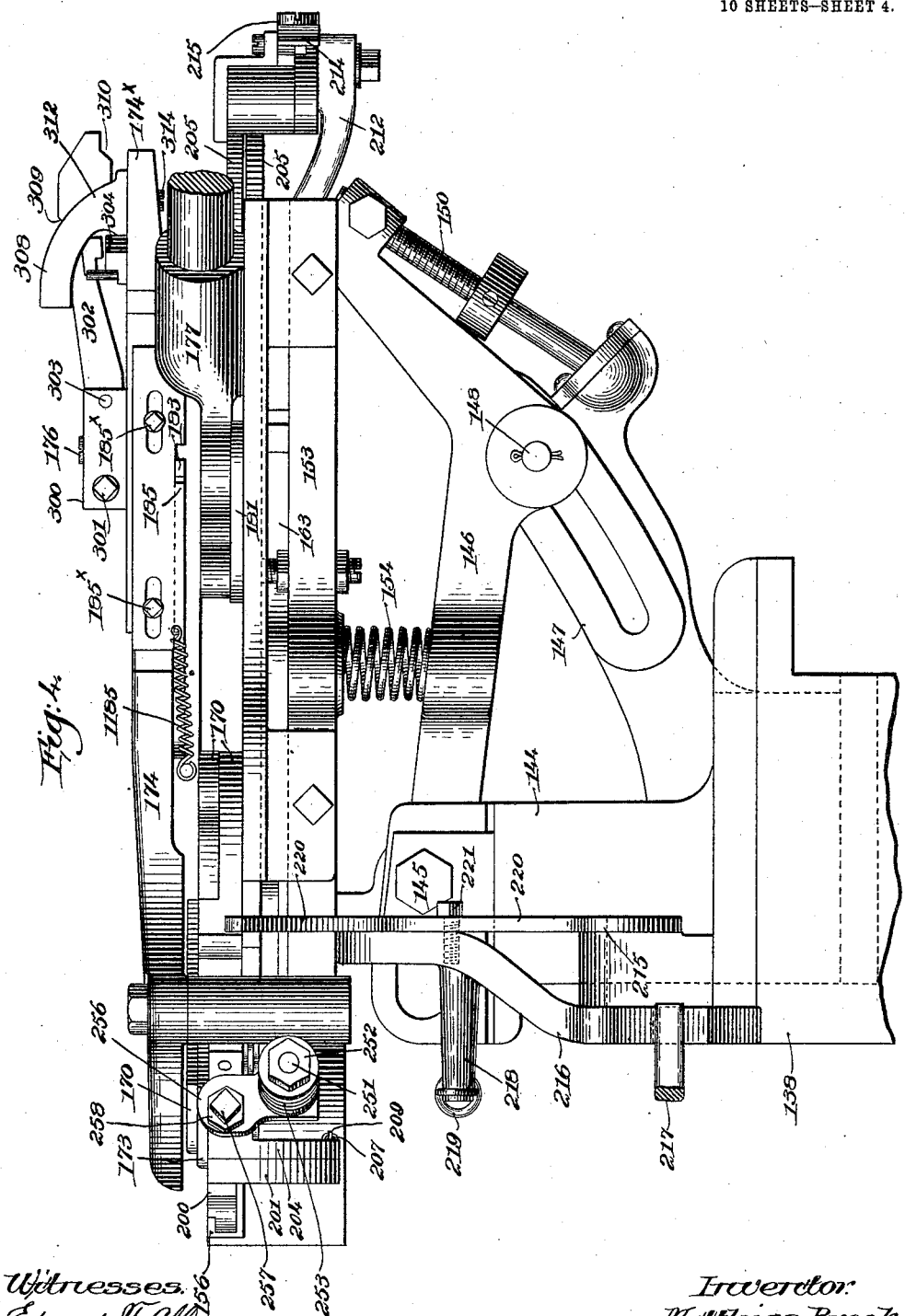

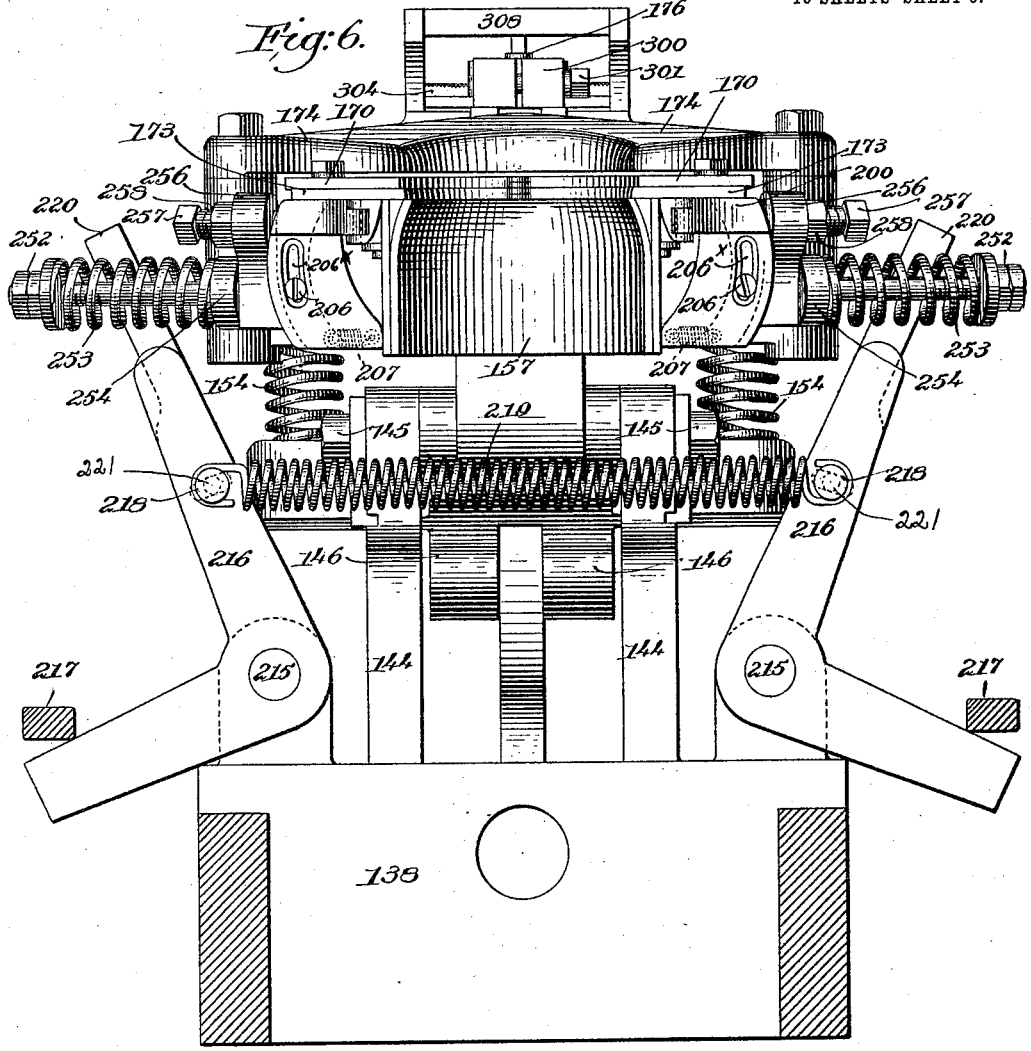

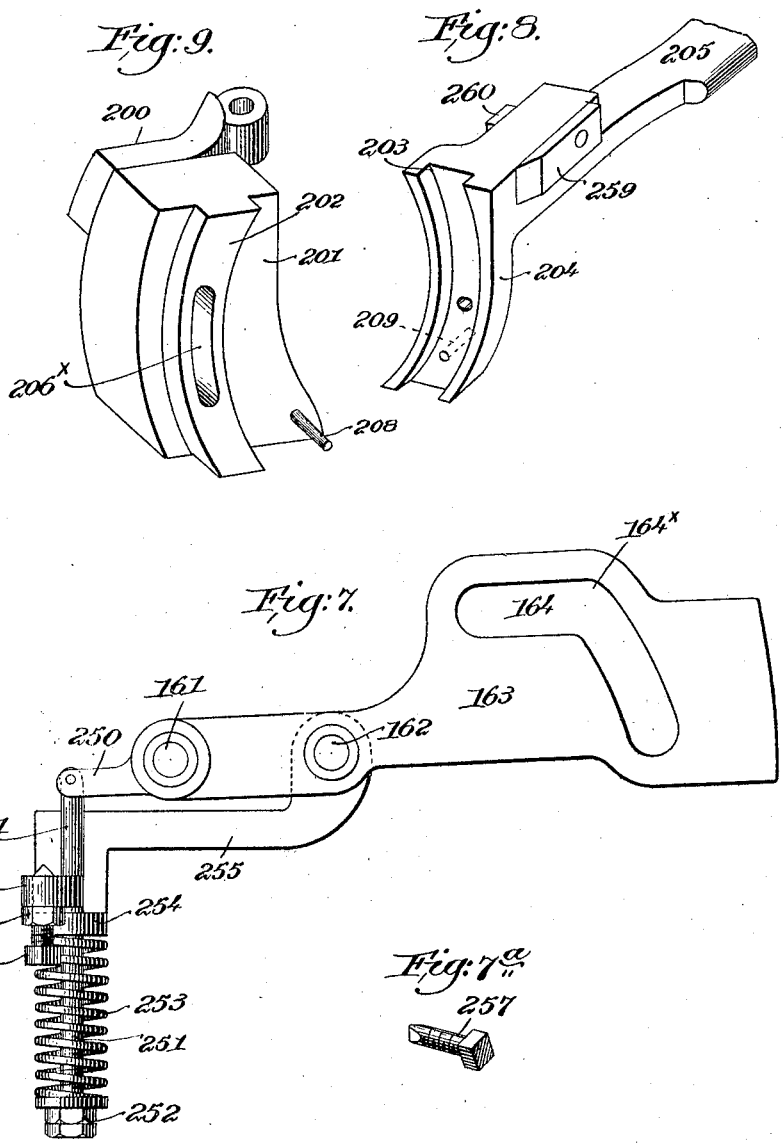

M. BROCK.
LASTING MACHINE.
APPLICATION FILED JULY 19, 1898.
1,030,564.
Patented June 25, 1912.
10 SHEETS—SHEET 8.
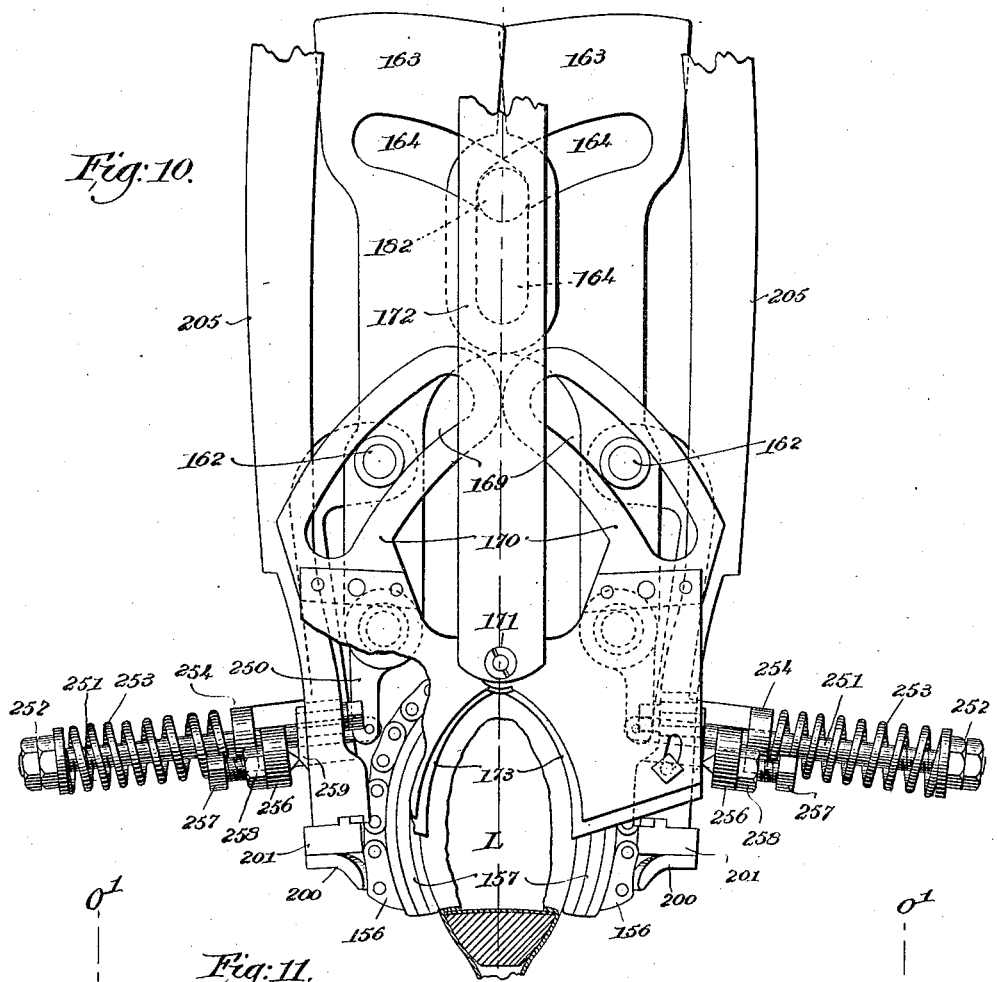
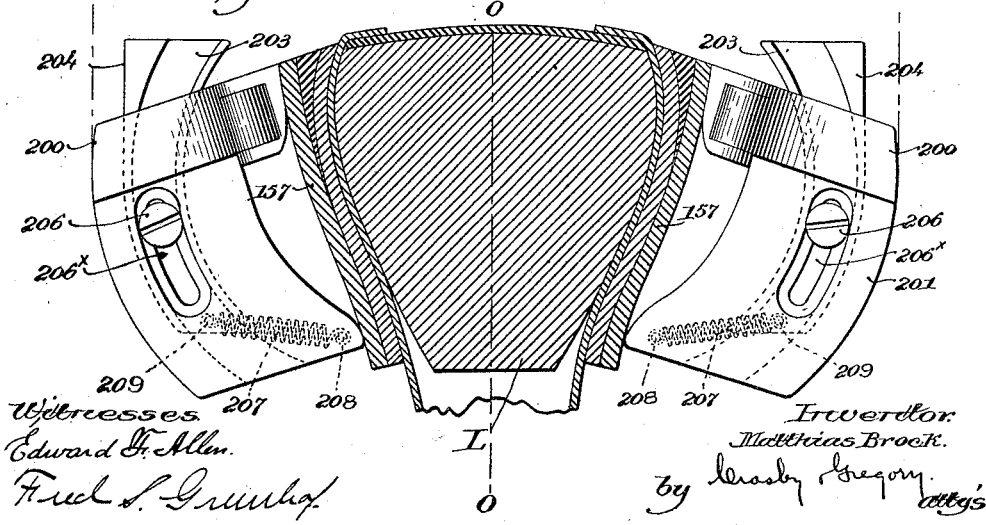
Witnesses
Edward G. Allen.
Fred S. Greenleaf.
Inventor:
Matthias Brock.
by Crosby & Gregory
attys.

M. BROCK.
LASTING MACHINE.
APPLICATION FILED JULY 19, 1898.
1,030,564.
Patented June 25, 1912.
10 SHEETS—SHEET 9.
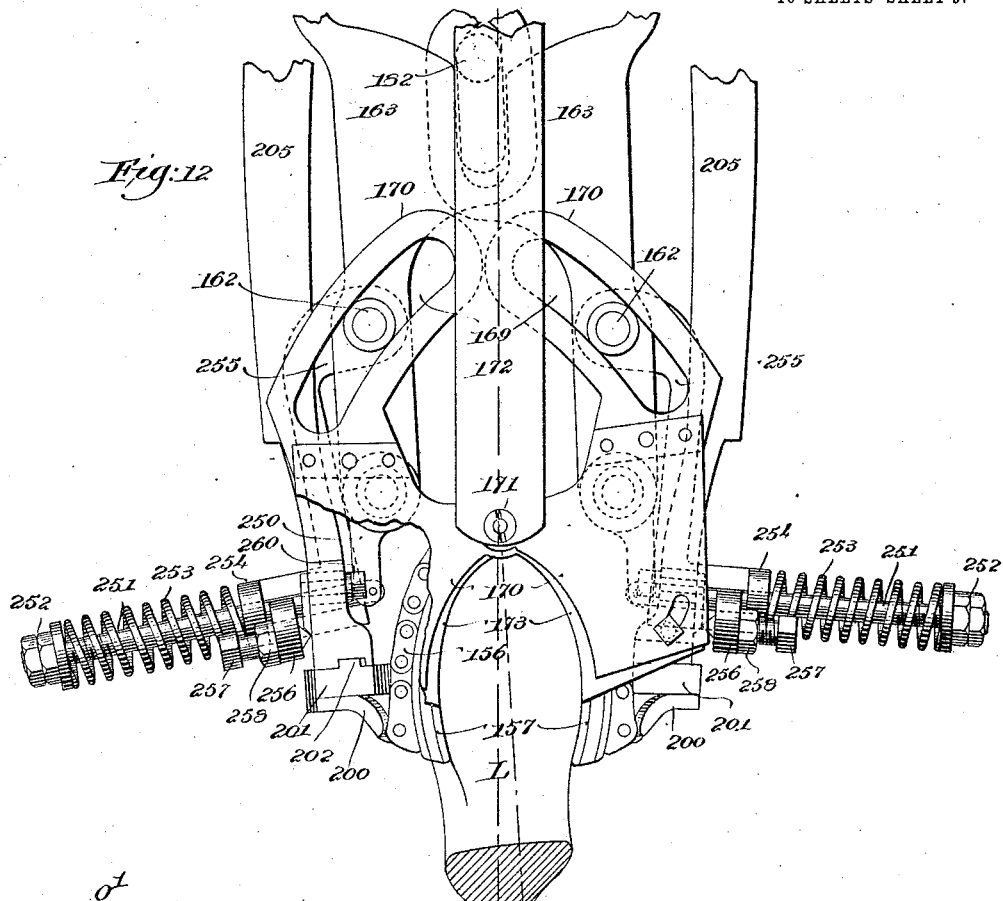

M. BROCK.
LASTING MACHINE.
APPLICATION FILED JULY 19, 1898.
1,030,564.
Patented June 25, 1912.
10 SHEETS—SHEET 10.
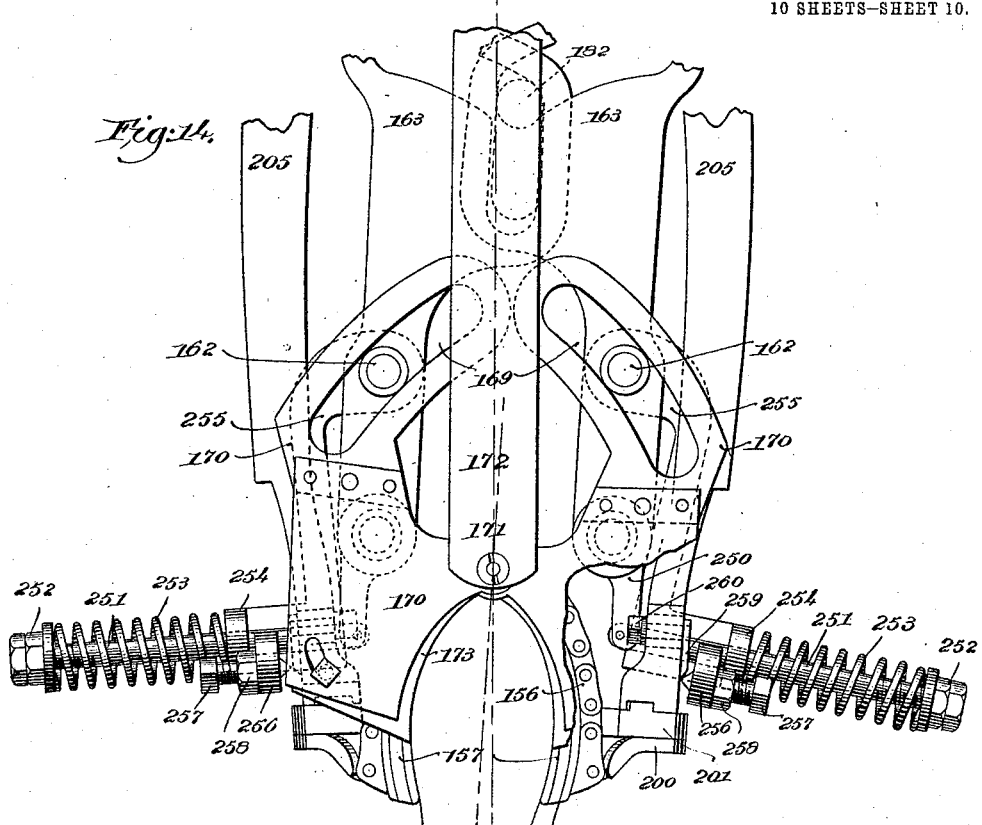
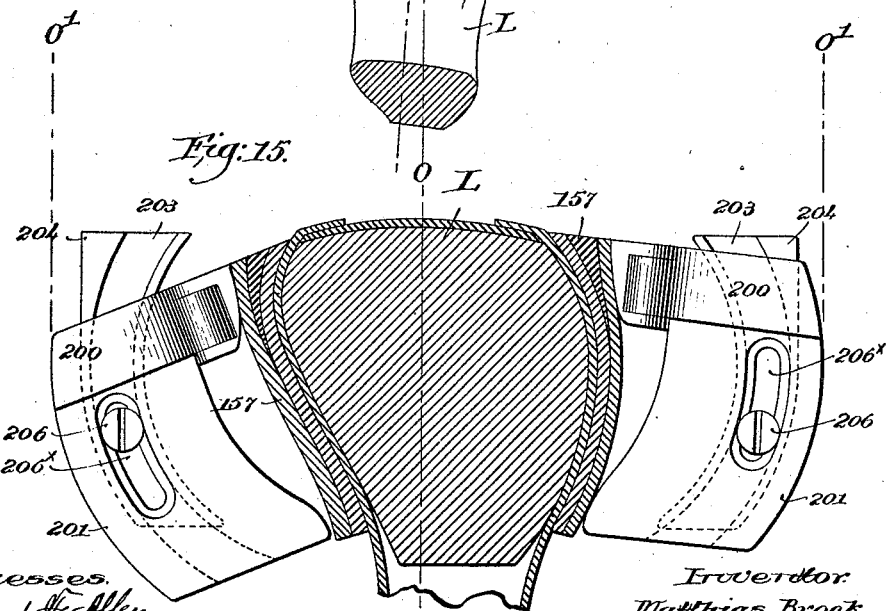

UNITED STATES PATENT OFFICE.

MATTHIAS BROCK, OF BOSTON, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

LASTING-MACHINE.

1,030,564.  Specification of Letters Patent.  Patented June 25, 1912.

Application filed July 19, 1898. Serial No. 686,319.

*To all whom it may concern:*

Be it known that I, MATTHIAS BROCK, of Boston, county of Suffolk, State of Massachusetts, have invented an Improvement in Lasting-Machines, of which the following description, in connection with the accompanying drawings, is a specification, like letters on the drawings representing like parts.

This invention relates to lasting machines of the type employing end and side lasting devices, as distinguished from the step by step or "pincer" class of machines, the invention having especial reference to the lasting devices which operate at and in the vicinity of the end of the last.

A machine illustrating the type to which my invention relates is shown and described in Letters Patent No. 601933, issued to me under date of April 5, 1898, to which reference will hereinafter be made in connection with the description of my invention, although it is to be understood that the machine illustrated in said patent is referred to by me merely for convenience in describing one embodiment of my invention, and I am not to be understood as limiting my present invention in any way by so referring to the machine of said patent.

The general object of my invention is to improve the construction and operation of the end lasting mechanism and coöperating parts, in order that the machine may operate upon and last more perfectly than prior machines the upper material on lasts presenting extreme irregularities in outline or in cross-sectional shapes or configurations.

The various features of my invention and the best mode of applying the same now known to me, will be set forth in the following description in connection with the accompanying drawings and particularly pointed out in the claims at the end of this specification.

In the drawings, Figure 1 is a top or plan view of an end lasting mechanism illustrating one embodiment of my invention. Fig. 2 is a similar view with the cap removed and with the operating handle and connected parts in different position. Fig. 3 is a view similar to Fig. 2, with the operating handle and lasting plates removed, the remaining parts, however, being substantially in the same position as indicated in Fig. 2. Fig. 3ª is a detail to be referred to. Fig. 4 is a side elevation of the mechanism shown in Fig. 1. Fig. 5 is a vertical longitudinal section of the parts shown in Fig. 1, the section being taken along the dotted line *x—x*. Fig. 6 is a left hand end elevation of the parts shown in Fig. 1, the view looking directly toward and into the clasp into which the end of the last is to be inserted. Fig. 7 is a detail of a part of the connections between the lasting mechanism and clasp, to be referred to; Fig. 7ª is a detail of one of the adjusting screws 257; Figs. 8 and 9 are perspective details of parts for holding one of the outer or free ends of the clasp, to be described. Fig. 10 is a diagrammatic plan view, partially broken away, illustrating the positions of the several parts when applied to a "straight" last. Fig. 11 is an enlarged or full size end view of the clasp in the position Fig. 10, the last being shown in section. Fig. 12 is a view similar to Fig. 10, but with the parts in the positions they will assume when applied to the end of a right last having an irregular cross section. Fig. 13 is an enlarged end view of the clasp in the position shown in Fig. 12, the irregular right last being shown in section. Fig. 14 is a view similar to Fig. 12, but with the parts in the positions they will assume when applied to the end of a left last having an irregular cross section, and Fig. 15 is an enlarged end view of the clasp in the position shown in Fig. 14, the irregular left last being shown in section.

Referring to the drawings illustrating one embodiment of my invention, the mechanism there shown is arranged with special reference to acting upon the material at the heel end of a last, the mechanism in this respect, and also in its general type or construction, resembling the heel lasting mechanism illustrated in Figs. 5 to 10 inclusive of my said Patent No. 601933, it being shown also in general in my other patent of the same date No. 601935. I desire it to be understood, that as stated in my said patents the mechanism herein shown as particularly suited for one, the heel, end of a last, may by use of the ordinary skill of one familiar with the art, be easily adapted to and used at the opposite or toe end of the last; so that my invention is to be regarded as applicable to either or both ends of a last. For convenience in description, I shall, as far as possible, employ the same reference characters as are employed to indicate the same or corresponding parts in my said Patent No. 601933, to which reference may be had if any more detailed description is required than is given herein. My improved mechanism to be described is intended to be used, if desired, with the side lasting devices and general operating and controlling means for the machine as a whole which are shown in said Patent No. 601933.

Referring now to the drawings of this present application, particularly to Figs. 1 to 6, inclusive, the sliding heel carriage 138, Fig. 4, built up in desired manner of the desired parts, or, it may be, integral, is made longitudinally adjustable in the guideways of the table shown in said Patent No. 601933, (but omitted herein,) by a screw working in the screw-threaded lug 139, see Fig. 5, by means of which said carriage may be moved longitudinally to bring the mechanism up to proper working position adjacent to the end of the last, whatever be the length of the latter. This heel carriage is provided with two vertically extended arms or stands 144, Figs. 4 and 6, slotted at their upper ends to receive a horizontally adjustable bolt 145, on which is pivoted the tipping plate holder 146, shown as bifurcated at its rear end to receive the curved bar 147 rising from the carriage 138 and slotted to receive a guide pin 148 passing through the plate holder 146 referred to. This tipping plate holder 146 at its rear end (see Fig. 5) carries a swivel nut 149, in which is threaded the adjusting screw 150 connected at its lower end, preferably by universal joint, with a lug on the slotted arm 147 of the carriage referred to. Rotation of the adjusting screw 150, swings the plate holder and parts carried thereby vertically about the horizontal pivot bolt 145, said bolt sliding somewhat in the slots of the supports 144 to vary the tip or vertical inclination of the plate holder, thereby to adapt the parts mounted thereon to the variations in spring of the lasts, at the ends thereof. At its two ends, see Fig. 5, the plate holder 146 is provided with vertically extended ears 151, to which is hung on the longitudinal trunnions 152 the tipping plate 153. This tipping plate may roll or swing transversely about the longitudinal axes of the trunnions 152, to adapt its parts automatically to the roll of the adjacent end of the last, substantially as described in my said Patent No. 601,933, springs 154 at the sides of the plate, see Fig. 6, acting to maintain the latter normally in its intermediate, central or horizontal position. The front of the tipping plate 153 is recessed to receive loosely therein the swivel shank 153ʸ, of a link or block of the clasp chain 156 within which is arranged in usual manner the flexible clasp 157 adapted to embrace the adjacent end of the last with the material thereupon the ends of the clasp chain 156, and therefore, the ends of the clasp, are made to open and close about the end of a last, and to this end, in the embodiment of my invention herein shown, the ends of the clasp chain, see Fig. 3, are provided with laterally extended ear plates 200, which are formed integral with or rigidly secured to the faces of end pieces in the form of sector blocks 201, one of which is shown separately in Fig. 9. The inner faces of these sector blocks 201 are shown as provided with sector-like guiding ribs or projections 202, adapted to slide freely in the direction of the depth of the last in correspondingly curved grooves or depressions 203, see Fig. 8, in the front faces of the sector-like heads 204 of the long levers 205.

Preferably and as herein shown, the ends of the clasp are allowed to roll quite independently of one another so that each end portion of the clasp may adapt itself to the particular contour of the side of the last engaged by it.

While the sector blocks 201 are made to slide freely on the faces of the heads 204 and in paths fixed by the curvature of the guides 202 and grooves 203, said sector blocks are, nevertheless, limited in such movements and held in position against and upon the said heads by limiting screws 206, see Fig. 6, which pass through slots 206ˣ in the blocks 201 and are tapped into the heads 204.

Springs 207, indicated in dotted lines Figs. 6 and 11, connect the pins 208, Fig. 9, on the sector blocks with the pins 209 projecting from the heads 204 as shown in full lines in Fig. 4 and in dotted lines in Figs. 8 and 11, said springs serving to maintain the sector blocks normally in the positions illustrated in Fig. 6, with the lower ends of the slots 206ˣ against the screws 206, thus holding the free ends of the clasp in substantially vertical positions.

All lasts are more or less tapering or wedge shaped in vertical cross section, as illustrated in Figs. 11, 13 and 15 which show sections through the heel end of a last, the last being widest in the vicinity of the bottom or sole, which is turned upward when the last is positioned in a lasting machine. Hence, when the clasp is closed about the end of a last so positioned, the upper edge of the clasp will first meet the material upon the last near the edge of the upturned bottom thereof, and will press such material closely against the last, after which in a machine made according to the present invention, further pressure upon and tending to close the clasp will cause the sector blocks to slide in their curved guideways on the heads, against the action of the springs 207, and thereby turn the ends of the clasp inwardly at their lower edges, that is, roll the ends of the clasp, to enable the latter to fit perfectly and tightly about and upon the tapering or curved side portions of the last.

In machines of this type, as heretofore constructed, so far as known to me, no provision has been made to enable the clasp to roll to fit the configuration of the sides of the last, hence the clasp would not close in tightly upon the narrowest portions of a last, and would leave the material thereat more or less loose, causing imperfect work at times. By providing suitable mechanism, such, for instance, as that just described, to enable the free ends of the clasp to roll independently of one another, the ends of the clasp on meeting a last are enabled to adapt themselves perfectly to the curvature or vertical inclination of the sides of the last, whether the two sides of the last, when viewed in cross section, presents substantially the same inclination, as in Fig. 11, or different inclination or curvature as in Figs. 13 to 15, since the two sector blocks and the two ends of the clasp carried thereby are free to roll independently, according to the particular inclination or curvature of the side of the last against which they are respectively pressed. It is to be understood that these are important features of this invention. One of the incidental advantages of this construction is that by reason of the clasp fitting perfectly to and about the end of a last, it is possible to employ the clasp as a means for alining the lasting devices to correspond with the alinement of the end of the last, whatever be its swing, with greater accuracy than has heretofore been possible. In this connection it may be stated that the swivel shank 153$^x$, Fig. 5, at the back of the clasp chain and which enters the forward end of the tipping plate as above described, is unrestrained in its rotation which permits the inner or closed end of the clasp to roll or tip within certain limits to enable the inner or closed end of the clasp to adapt itself to such extent as may be necessary to the roll presented by and at the extreme end of the last. The shank 153$^x$ is also free to slide axially in the socket in which it is entered, which it does more or less as the levers 205 are moved in fitting the clasp to the last end and removing it therefrom.

So far as known to me I am the first to construct a clasp so that it may roll as a whole, as in the present instance, or so that its free ends may roll or twist independently of each other, or independently of the closed end, or to a greater extent than the closed end, and it is obvious that the mechanism by which to obtain this rolling action may differ from the particular means herein shown and described.

By the term "roll" as applied to the movement of the free ends of the clasp, I mean such a movement of the outer ends of the clasp as permits them to conform to the curvature of the side of the last rather than a movement in a curve opposite to the curvature of the side of the last, said rolling movement being in the direction of the height or thickness of the last from the bottom to the comb thereof.

Referring now again to Fig. 3, the levers 205, carrying at their ends the sector blocks, of Figs. 8 and 9, are shown as extended to points remote from the clasp, preferably to the extreme back of the head, where they are curved and crossed like a pair of shears and provided at their extreme ends with depending fulcrum pins 210. Preferably and as herein shown, the fulcrum pins 210 are adapted to yield and to this end they are received in open sided recesses in a cross bar 211 carried by a rearwardly extended tail piece 212, see Figs. 4 and 5, bolted or otherwise secured to the tipping plate 153, said tail piece 212 having a central opening 212$^x$, through which rises one of the upwardly extended trunnion carrying ears 151 of the tipping plate holder.

The entrances to the recesses which hold the fulcrum pins 210 are closed by blocks 213, see Fig. 3$^a$ acted upon by the ends of a spring 214, secured, as by a screw 215, to the cross-bar 211 referred to, so that while the fulcrum pins 210 are normally held in strictly pivotal positions within the recesses referred to, yet said pins will yield under a pressure exerted by the clasp upon and tending to move the levers 205 rearwardly as when the center of the clasp fits the end of the last snugly.

It will be noticed that the paths of movement of the ends of the clasp in opening and closing are determined by the location of the fulcra of the respective levers 205, to which the free ends of the clasp are connected, and by the radial lengths of the said levers.

Referring to the drawings, particularly Figs. 2 and 3, it will be noticed that the fulcra for the respective levers 205 and the ends of the clasp to which the respective levers are attached, are on opposite sides of the longitudinal center line of the head or longitudinal or middle line of the clasp. By reason of this arrangement the ends of the levers, and therefore the ends of the clasp, are caused to advance, that is, to have a component of movement lengthwise of the last as they are closed about the last. This will be clearly apparent from Figs. 2 and 3, in which it will be seen that each lever 205 in moving in an arc about its pivot pin 210 will carry the end of the clasp slightly to the left as it moves the clasp toward the side of the last. This results in drawing the clasp forwardly and about the last at the same time that it is closed laterally against the sides of the last.

In machines of this type as heretofore constructed, levers if employed for carrying the free ends of the clasp, have been pivoted at the same side of the middle line of the clasp as the ends of the clasp to which they are respectively connected, so that as they are moved inwardly with the closing in of the ends of the clasp, the arcs were such that the ends of the clasp would be swung toward the heel end of the last. This acted to full the clasp and prevent it from tightly fitting the end of the last, whereas by my invention they are moved, in closing, toward the toe end of the last so as to draw the clasp more tightly about the last. This improvement is obviously of great importance in securing a perfectly fitted upper.

If by reason of unusual fullness of the end of any last the length of the clasp will not permit the levers to swing forwardly and inwardly about their fulcra when the latter are in their normal positions, said fulcra will yield backwardly against the pressure of the spring 214 to permit the levers 205 to move rearwardly a sufficient distance to enable the clasp to be closed fully about the end of the last.

So far as I am aware I am the first to provide means for closing a clasp about a last and simultaneously drawing the ends of the clasp forwardly; also the first to provide such means with provision for yieldingly drawing the clasp forwardly; and further I am the first to provide levers, coöperating with the free ends of the clasp in the opening and closing of the latter, with yielding fulcra, or fulcra having yielding axes, whether constructed in the specific manner herein shown or in any other manner.

In the machine of my Patent No. 601933 referred to, the end clasp is closed about the end of the last by movement of the operating handle employed to actuate the lasting devices. My present invention comprehends means for closing the clasp independently of the movement of the said operating handle. Such means is best illustrated in Figs. 3, 4 and 6, particularly Fig. 6, and may be described as follows: Upon the sliding carriage 138 are fulcrumed at 215 two oppositely arranged bell crank levers 216, the lower arms of which are acted upon by devices indicated at 217 and which may be a treadle or other suitable operating means for depressing the lower ends of the levers and releasing them at appropriate times. The upper ends of these bell crank levers 216 are shown provided with studs 218 which are connected by a spring 219, tending constantly to draw the upper ends or arms of the said levers inwardly and toward each other. Pivoted to move about the same fulcra 215 as the bell crank levers 216, are two other simple levers 220, Figs. 4 and 6, adjustably connected with the upper ends of the bell crank levers 216 by clamping screws 221, see Figs. 4 and 6, extended through slots in the simple levers 220, and by means of which the positions of the bell crank levers with reference to the simple levers which are moved thereby, may be varied, as desired, for varying the pressure exerted by the spring 219 through said simple levers upon the connected parts, as will be described. These simple levers 220 at their upper ends are held against the outer edges of the long, clasp carrying levers 205 referred to, so that the normal tendency of the spring 219 is to press the simple levers 220 and the long levers 205 inwardly to close the clasp about the end of the last. Normally this tendency of the spring to close the clasp is resisted by the devices 217 referred to, but after the last has been positioned in the machine and the head advanced to bring the back of the clasp against the end of the last, the devices are released and the spring is permitted to close the clasp about and upon the end of the last as described.

The sliding of the shank $153^x$ in its socket is of advantage for when a new last is pressed into the clasp, however full the end of the last may be, the end of the last will first of all contact with the middle of the back of the clasp, and further pressure tends to press the back of the clasp rearwardly against its seat or support furnished by the front end of the tipping plate, causing the area of contact of the clasp with the last to spread gradually and uniformly from the end of the last and middle of the back of the clasp in opposite directions around the end of the last toward the free ends of the clasp, thereby tending to fit the material smoothly and closely about and upon the end of the last, without the looseness and wrinkles which not infrequently occur in the application of clasps in the ordinary manner to the ends of lasts.

So far as known to me I am the first to make provision in a lasting machine for the clasp or any portion of it to move forwardly during its closing movement. Most clasps have their rear middle portions rigidly attached to a fixed support so that they can not move forwardly relatively thereto.

Turning now to Fig. 2, I will describe the construction and operation of the lasting devices and the connection of the same with the clasp and its coöperating parts. The operating handle 177 is pivoted at 178, see Fig. 2, to one end of a link 223, pivoted at its opposite end, at 222, to the top plate 174, see Fig. 1. This operating lever receives a pin or screw 176 to be hereinafter referred to and which rises above the said lever and through a slot 175, see Fig. 5, in a slide bar 172. A set screw 176ˣ tapped into the rear end of the slide-bar furnishes means by which to vary the effective length of the slot 175. To the front end of this sliding bar 172, see Fig. 2, are pivoted at 171 the wiper carriers 170 to the undersides of which are adjustably secured the wiper plates 173 constituting one form of end lasting devices heretofore referred to. The tail portions of the carriers 170 are shown as slotted diagonally, as at 169, to receive the roller studs 162 rising from the levers 163 fulcrumed (Fig. 3) at 161 upon the tipping plate. Assuming the levers 136 to be held in stationary or relatively stationary positions, movement of the operating handle in the direction of the arrow causes the slide bar 172, to slide longitudinally to the left in the several figures, and advance the wipers over the end of the last, indicated at L. During this advance movement the diagonal slots 169 of the wiper carriers, embracing the relatively stationary studs 162, will spread the rear ends or tail portions of the wiper carriers, and will cause the forward portions of said carriers, and the wipers, to be closed together or inwardly, over the last, to lay the material to be lasted. Movement of the operating handle in the direction opposite to that indicated by the arrow will withdraw and open the lasting plates.

Referring now to Figs. 3 and 5, the pivot pin 176 previously referred to as projecting upwardly from and through the handle lever 177, is shown as extended below the said handle lever and fixedly secured in and to one end of the link 181, from the opposite end of which depends the roller stud 182 having two rollers which, see Fig. 3, lie respectively in the divergent slots 164, in the free overlapping ends of the levers 163 before referred to.

The outline of one of the slots 164 and the lever in which it is cut are best shown in Fig. 7.

The levers 163 and consequently the lasting mechanism or actuating devices therefor, are connected with the clasp for acting upon the latter by a mechanism best shown in Figs. 3 and 7. Referring to these figures, each lever 163 has a finger 250 projecting forwardly from the fulcrum 161 and to which is jointed one end of a spring rod 251 provided at its outer end with one or more check nuts 252. Seated against the check nuts 252 and encircling the rods 251, are coiled springs 253 seated at their other ends against ears 254 on the free ends of the short spring levers 255, see Fig. 7, jointed to the respective levers 163 at points shown as coincident with the axes of the roller studs 162, which have been described as rising through the diagonal slots in the wiper carriers, for opening and closing the latter. These spring levers 255, see Figs. 6 and 7, have upwardly extended ears 256 in which are tapped the pointed set screws 257, one of which is shown in Fig. 7ª, said screws being locked by nuts 258, in position with their pointed ends, see Fig. 3, normally pressed by the springs 253 against what I call the cam plates 259 on the outer faces of the long clasp levers 205. These cam plates 259 are herein shown as longitudinally adjustable on the outer faces of the levers 205 and are secured in position by the screws 260. It is of course obvious that the faces of the cam plates 259 may have any desired shape and also that these faces might be formed upon the levers themselves instead of upon plates secured to the levers.

With the operating or handle lever 177 in its extreme rearmost or retracted position, the roller stud 182, Fig. 3, lies at the extreme rearmost ends of the divergent slots 164, see Fig. 1, which are thus brought into coincidence, drawing together the adjacent ends of the levers 163, and throwing outwardly the forwardly projecting ends or fingers 250 and retracting the springs 253, that is, separating the same, so as to permit the clasp to open fully for the withdrawal or insertion of a last.

After the last has been positioned in the machine, and the heel carriage moved forwardly to bring the heel lasting mechanism into position to act on the shoe, the first operation, as described, is to release the treadle devices and permit the spring 219, Fig. 6, acting through the bell crank levers described, to press the clasp closely about the end of the last. Thereafter when the operating lever 177 is moved in the direction of the arrow in the several figures, to actuate the lasting devices, the initial movement of the lever, which takes place while the pin 176 is traversing the slot 175 of the slide-bar 172, acts through the roller stud 182, in the pronounced angular and divergent portions of the slots 164, to separate the rear ends of the levers 163, Fig. 3, and thereby, through the fingers 250, and springs 253, press the pointed ends of the screws 257 against the cam plates 259, and thereby further press the clasp about and upon the end of the last. This pressure upon the clasp exerted by the movement of the operating lever, is in addition and supplemental to the initial closing pressure exerted through the spring 219, and bell crank levers referred to. By the time the roller stud 182 has advanced through the most pronounced angular portions of the slots 164, and to a point in the vicinity of the bend 164ˣ, Fig. 7, the pin 176, which extends upwardly through the operating lever, reaches the end of the slot 175, and thereafter further movement of the lever in the same direction pushes longitudinally before it the slide-bar 172, thereby closing the lasting devices over the last, and laying the material down thereupon.

During the period of operation of the lasting devices, after the pin 176 reaches the end of the slot 175, the corresponding forward movement of the roller stud 182 acts in the nearly longitudinal though slightly divergent forward ends of the slots 164, to press with constantly, though slightly increasing pressure, upon the clasp, thereby to hold the material firmly against the sides of the last, while its edges are being lasted inwardly by the lasting devices.

Any movement tending to press the clasp about the last, in excess of the possible closing movement of the clasp, by reason of its fitting the last closely, is taken up by the springs 253 in essentially the same manner as any such excess of movement is taken up by the springs 165 in my Patent No. 601,933.

From the foregoing description it will be clear that the clasp is connected through the medium of the springs 253 with the levers 163, the rollers 162 of which govern the opening and closing movements of the wipers or lasting devices, and in accordance with the well known principle of operation of machines of this type, and as illustrated in my several patents of April 5, 1898, any swinging movement of the clasp in adapting itself to the swing presented by the end of a crooked last, whether a right or a left, is communicated through the springs 253 to the fingers 250 which swing the levers 163 about the fulcra 161 and move the studs 162 which are shifted transversely of the head, through distances corresponding to the extent of swing of the clasp, and thereby, through the divergent slots 169 of the wiper carriers, correspondingly shift the said carriers and the wipers thereon likewise into position coincident with the alinement of the end of the last, whatever be its swing and regardless of whether it be a right or a left last. This transverse adjustment by the clasp of the lasting plates or devices to meet the alinement or swing of the end of a crooked last, as the clasp fits itself to that end of the last, is substantially as shown in my patents of April 5, 1898, except as to the particular connections or mechanism through which the adjustment of one is communicated to the other, the adjustment of the plates by the clasp, as the latter meets the last, being automatic in the present instance as in my former patents. In my present machine, however, the first closing of the clasp about the end of the last, and therefore the preliminary adjustment or set of the lasting devices, is effected automatically by the spring 219, before the handle lever 177 has been moved. This preliminary closing of the clasp and adjustment of the lasting devices relieves the lever 177 of just so much work, which it has to perform in the machines of my patents referred to, where the entire closing of the clasp and adjustment of the lasting devices is performed by the lever. I have found, however, that in crooked lasts, for instance of the Waukenphast type, the outlines or peripheries of the bottoms of the lasts sometimes differ greatly from the outlines of the body portions of the same lasts. For example, in many lasts the body of the last near an end thereof when viewed in vertical cross section, presents a fullness at one, usually the inner side of the last, as illustrated in Fig. 13, which is greatly in excess of the fullness presented at the opposite or outer side of the last, and in some cases the fullness at the inner side of the last is actually opposed at the opposite side, by a depression. This causes the last to present an outline and swing in the horizontal plane of the upturned bottom of the last which differs from the corresponding outline and swing in the horizontal plane through the body, below the bottom. In operating upon lasts of this type, it is perfectly clear that according to the present invention the clasp, in embracing the end of a last, will fit itself closely to the last, at the upturned bottom thereof, as well as about the fuller body below the bottom, yet the general alinement or swing of the clasp will be that of the fuller body portion of the last rather than that of the bottom of the last if the latter varies greatly from the alinement of the body portion; hence the clasp would naturally position the lasting devices to meet the swing or alinement of the body portion of the last embraced by the clasp, and not to the bottom portion of the last, the outline and swing of which does not correspond with that of the body portion.

If the variation between the horizontal outline of the body portion of the last, embraced by the clasp, and the outline of the bottom of the last acted upon by the lasting devices, was always the same and at the same side of the last, it would still be possible to adjust the mechanism so as properly to adjust the lasting devices by and from the clasp. The difficulty, however, is that in lasts of this type, the excessive fullness appearing at the inside of the body of the last, comes at the front side of the machine when operating upon a right last, and at the rear side of the machine when operating upon a left last, so that if the machine were so adjusted as to correct the error for a right last, it would aggravate the error for a left last of the same type. A feature of my present invention, however, contemplates correcting this inaccuracy of adjustment, and in accordance with this part of my invention I make the connections between the clasp and the lasting devices automatically adjustable, in other words, they are constructed in such a manner that when the clasp meets the end of a last and embraces the body portion thereof, the connections between the clasp and lasting devices automatically adjust themselves with reference to the connected parts, so that it matters not whether the excessive fullness of the body of the last appears at the front side of the machine or at the rear side of the machine, the lasting devices nevertheless will be adjusted properly to bring their alinement into proper position to act uniformly upon opposite sides of the bottom of the last, which differs in outline from that of the body of the last embraced by the clasp. These connections, in the form in which I have herein illustrated them, comprise the parts, best illustrated in Figs. 3 and 7, interposed between the lasting devices and the levers 205 engaging the ends of the clasp, and the automatically adjustable features of those connections are more particularly the pointed screws 257 and the cam plates 259. The operation of these automatically adjustable connections will best be understood by a description of the several diagrams in the drawings.

In Fig. 1 the end clasp and lasting devices are in truly central positions, that is, they are respectively in the positions into which they naturally return at the end of each lasting operation.

Fig. 11 is a face view of the open end of the clasp showing in vertical section a last with an upper in position thereupon. This last, it will be noticed, is perfectly regular in cross section, that is, the outline or contour of one side is exactly the same as on the opposite side; in other words, it is a perfectly regular cross section of what is known in the art as a straight last, and therefore requires no positioning at either side different in any way from that at the opposite side. The sectors are both rolled into corresponding angular positions to fit the two ends of the clasp equally to the corresponding sides of the last, and on a straight last the only possible variation that might take place in the positioning of the two sectors would be due to a possible variation in the thickness of stock or material at one, as compared with that at the opposite, side of the last.

Referring now to Fig. 10, it will be seen that for a straight last of the character shown in Fig. 11, where the ends of the clasp respond evenly to the uniform curvature at the two sides of the last, said clasp will retain its central alinement corresponding to the straight median line of the last and will therefore, through the roller studs 162, maintain a correspondingly central and straight alinement of the wiper plates or lasting devices, causing them to move inwardly with perfect uniformity over the sides of the last, they being shown in the drawing, Fig. 10, as just closing over the periphery of the last with the material thereupon. With such straight and regular cross-section last, the operation of the lasting devices takes place with both screws 257 resting upon the high parts of the cam plates 259, just at the head of the forward inclined faces of the said plates. Consequently, the regular cross section of the last or uniform fullness of the latter at its opposite sides produces, through the uniformity in the connections between the clasp and wiper plates, a uniform centralizing action, due to the equal draft or tension exerted through the medium of the interposed springs 253.

As far as a last such as shown in Figs. 10 and 11 is concerned, with uniformity of thickness of material at both sides of the last, no adjustment in the connections would be necessary, in other words, the cam plates 259 and screws 257 might be omitted, and a permanent connection employed. Referring, however, to Fig. 13, I have shown a view similar to Fig. 11, except as to the positions of the parts which in Fig. 13 are shown as they will appear when applied to the irregular cross section of a right last, such for instance as shown in Figs. 2 and 3.

Reference to Figs. 2, 3 and 13, will show that in an extreme or crooked last, the fullness at the inside, which is at the left, Fig. 13, greatly exceeds that at the outer or right side, so that while the sector at the full side of the last is held in a more nearly vertical position than the sector at the opposite or shallow side of the last, in order to adapt that end of the clasp to the different curvature presented at the full side, it is also clear that the sector at the inner or full side is prevented from approaching the vertical center line o, o, of the head as closely as the sector at the opposite or shallow side of the last. This difference is readily determined by measuring the distances between the outer edges of the sector blocks, indicated for convenience by the lines o′, o′, and the common center line o, o. Thus the lever 205 connected with the sector at the full side of the last is held farther away from the longitudinal middle line of the head or mechanism than the corresponding lever 205 connected with the sector at the shallow side of the last. With connections which were not automatically adjustable, this unequal positioning of the levers 205 with reference to the bottom of the last would cause a corresponding unequal positioning of the lasting devices or plates with reference to the bottom of the last. In other words, the springs 253 interposed between the levers 205 and the lasting plates would centralize the lasting plates with reference to the position or alinement of the clasp, and as the clasp had adjusted itself to the body of the last, which is at variance with the bottom, it will be evident that the adjustment of the plates would be to the alinement of the body of the last, and therefore would not correspond with and be suitable for the bottom of the last. To obviate this improper adjustment of the plates by an irregular cross section of the body of the last, I have provided the automatically adjustable connections referred to which operate as follows: Inasmuch as the lever 205 at the full side of the last is pivoted at the opposite side of the center line of the head, at the rear end of the latter, said lever as it swings away from the longitudinal center line of the head, by reason of the excessive fullness at that side of the last, follows the arc of a circle and its end adjacent the clasp tends to move somewhat toward the rear of the head, that is, tends to draw toward the end of the last, which causes the screw 257 resting upon its cam plate 259 to slip down the inclined front face of the retreating cam plate, as distinctly shown in Fig. 12, the screw 257 of the other lever 205 at the opposite side of the last remaining, however, upon the top of its cam plate; in fact, the latter screw would tend to slide somewhat farther back from the crown of the inclined face. An unequal tension is thus thrown upon the springs 253, the pressure upon one spring 253 being reduced somewhat as compared with that upon the other spring, by reason of the former spring sliding down the incline and lengthening the distance between the opposed abutments between which it is arranged. This inequality, however, in the pressure of the two springs immediately tends to adjust itself to a state of equality by the outer abutment of the spring which has been weakened tending to follow inwardly the screw end which is moved down the incline, thereby turning the lever 163 and swinging outwardly the left hand roller stud 162, Fig. 12, while the excessive pressure on the other spring, at the right Fig. 12, tends to move its outer abutment farther away from the center line of the mechanism, thereby throwing its lever 163 and roller stud 162 inwardly and also to the left, Fig. 12. This adjustment continues until the pressures upon the two springs are substantially equal and the parts are so proportioned that this equalizing of the pressures upon the springs causes the two roller studs 162 to be shifted transversely or to the left, Fig. 12, a distance just sufficient to position the lasting plates or devices correctly for the alinement of the swing of the last at the bottom plane thereof where the wipers are to act, and which, of course, is different from the alinement of the end of the last on a lower plane, through the body, where the excessive or unequal fullness has been shown to exist. Thus by means of the automatically adjustable connections the clasp fitted to a given swing of the body of the end of the last adjusts the lasting devices to a different swing, existing in the plane of the bottom of the same end of the last.

Referring now to Figs. 14 and 15, I have shown the parts positioned as they will appear when applied to the mating or left last. It will be noticed that the excess of fullness in the cross section of the body of the last in Fig. 15 is at the opposite side of the last from what is shown in Fig. 13, consequently in fitting the clasp to the body of this left last, the other lever 205, viz., the one at the right of Figs. 13 and 15, will be held farther away from the center line of the mechanism than the corresponding lever at the left of said figures. This will cause the screw 257, at the right of Figs. 12 and 14, to slide down the incline as in Fig. 14, while the other screw at the left remains upon the top of the cam plate. This new positioning of the screws and cam plates causes the springs again to equalize themselves, but this time the equalizing action causes the roller studs 162 to move to the right, as in Fig. 14, instead of to the left, as in Fig. 12. This movement of the said studs to the right turns the lasting plates or devices into proper alinement for the bottom of the end of the left last, which, by reference to Fig. 14, will be seen to vary, as compared with the alinement of the body of the last on a lower plane, by substantially the same difference or variance as the alinement of the bottom of the right last, Fig. 12, varies as compared with the alinement of its body at the same lower level. It matters not, therefore, whether the fullness appears at the right or at the left side of the end of the last. The mechanism in either case will automatically adjust itself to bring the lasting plates or devices into proper alinement for the bottom of the last where they are to operate.

I have found by experience that different degrees of variance between the body section and the bottom of the last cause the screws 257 to slide to varying extents down the inclines of the cam faces, that is, if the excess of fullness of the body of the last is less on one model of last than on another, the screws 257 will slide only part way down the inclines, the distance down which the screws move, automatically varying with the variation in fullness which causes the sliding movement.

I have hereinbefore referred to a straight last as having a uniform cross section through the body, and I have also referred to right and left lasts as having excessive fullness at one side as compared with the other. It is, however, not uncommon for right or left lasts to have cross sections which are perfectly regular. In such instances my mechanism automatically adapts itself as before to the shape of the last, that is, a regular cross-section, whether on a right or left last, will cause both the screws 257 to remain upon the tops of the cam plates, while any excess of fullness on one side of the last as compared with the other, whether on a right or left last, will cause one or the other of the screws 257 to move down its incline to correct the positioning of the plates near the bottom of the last.

To retain the lasting devices or plates in proper alined position after they have been so positioned by the mechanism hereinbefore described, I have provided a novel form of locking device, best shown in Figs. 1, 4 and 5.

Referring particularly to Fig. 5, I have hereinbefore stated that the pivot screw 176 is rigidly mounted upon the link 181 at its lower end. This pivot screw is extended vertically above the top plate 174 of the head, and has secured to its end, above said top plate, a block 300, shown as split, see Fig. 1, in order that it may be clamped tightly about the said pivot screw in adjusted position, by means of a clamping screw 301. This block 300 is slotted at its rear end, at the right Figs. 1 and 5, to receive the end of a locking lever 302, pivoted at 303 between the ears formed by the slot in the said block, the free end of said lever traversing the toothed sector 304 fast on an arm 305 rearwardly extended from a block 306 loosely surrounding the pivot 176, and moved forward and back with the said pivot in a slot 307 arranged therefor in the top plate 174, said slot however preventing lateral swinging movement of said block 306 and toothed sector 304. When the hand lever is operated to advance the lasting plates or devices and finally press the end clasp about the end of the last, the forward movement of the hand lever causes corresponding movement of the vertical pivot pin 176, and as the said pin is moved forward by the hand lever the transverse swing imparted to the link 181 by its roller stud 182 in the slots of the levers 163 which swing transversely to adjust the parts to the swing of the end of a last, whether a right or a left, causes corresponding rotation of the pivot screw 176 rigidly mounted upon said link, and a corresponding swinging movement of the locking lever 302, and having been swung in one or the other direction by the fitting of the parts, referred to, to the end of the last, further movement of the screw 176 in advancing the plates over the last, draws the locking lever 302 forward whereupon it is forced into locking engagement with the teeth of the locking sector 304, by means hereinafter described, thereby locking the said lever, and consequently the link 181 and all the parts connected therewith, in the positions into which they have been moved in fitting the mechanism to the end of the last. At the close of the lasting operation, when the hand lever is returned to the right, the locking lever is moved rearwardly and then is raised out of engagement with the toothed sector 304, leaving the parts perfectly free to re-adjust themselves for a different swing, required by presentation of a different last when, on subsequent operation of the parts, the said locking lever by engaging other teeth of the locking sector will lock the parts in the necessary new positions. To move the locking lever into engagement with the locking sector, I have provided a relatively stationary yoke 308 spanning the locking lever 302, and which, as the locking lever is carried forward with the sector 304, acts upon an inclined surface 309 on the top of the head of said locking lever, and depresses said head and holds said lever positively in locking engagement with the teeth of the sector. Return movement of the locking lever at the close of the lasting operation causes an inclined face 310 on the underside of the head to ride upon a correspondingly inclined face 311 on the base 312 of the yoke, and positively lift the free end of the locking lever out of engagement with the locking sector. The surface of the base 312 of the yoke furnishes a suitable support for the free end of the locking lever, holding it out of engagement with the locking sector during the swinging of the same for adjustment previous to locking. The yoke 308 is shown as mounted upon a rearward extension 174$^x$, Fig. 5, of the cap 174, and to enable the position of the yoke and the timing of the positive locking to be varied, the said rearward extension is slotted as at 313, to receive the holding screw 314 on the yoke and whereby the yoke may be moved forward and back as required.

To prevent rattle of the parts during the preliminary adjustment, I have interposed a spring 315 Fig. 5 between the block 300 and the heel or pivot end of the locking lever 302, which acts constantly to press the locking lever downwardly either upon its seat 312 or into engagement with the teeth of the locking sector. While the teeth of the sector and the toothed end of the locking lever are preferably made somewhat V-shaped to facilitate engagement of the two, yet should the lever tend to ride upon the crown of an improperly formed or dulled tooth of the sector, the spring 315 during the forward movement of the locking lever, and influenced by the usual vibration of the parts, caused by operation of the same, will tend to seat the locking lever in proper engagement with the teeth of the locking sector before the inclined face of the lever reaches the top of the yoke, and thereby avoids jamming and injury to the parts, which would result, should the lever fail to seat itself in the sector before reaching positive engagement with the yoke.

The latch 183, Fig. 2, pivoted at 184, for engaging the pin 176, and preventing lost motion on the return of the parts to their normal position, all as described in my said Patent No. 601933, herein has its actuating stop 185, Fig. 4, made as a part of a plate, which is longitudinally adjustable on its support, the cap, in order that the timing of the release may be varied readily to suit the requirements of any particular case. The plate 185 may be retained in adjusted position by clamping screws 185ˣ, as shown in Fig. 4, and a spring 1185 is provided tending normally to move the plate in one direction, thus enabling its adjustment to be more easily effected.

By reference to Fig. 1, it will be seen that, viewing the head vertically, that is, from the top, the actuating mechanism for the lasting devices lies between the fulcra of the levers 205 and the clasp,—or, expressed differently, the levers are fulcrumed at that end of the head which is opposite the end where the clasp is located, I being the first, so far as I am aware, to carry the levers, which coöperate with the ends of the clasp, to a point remote from the clasp, in order to get the long swing with the advantageous results which have been hereinbefore referred to, and preferably they will be carried to the extreme end of the head as shown, in order to leave the actuating devices for the lasting plates undisturbed.

I have herein described one embodiment of my invention, it being the best embodiment thereof now known to me, but my invention is not limited or restricted in its adaptation and use to the particular mechanism shown, for it is perfectly evident that the same may be varied greatly within the spirit and scope of the invention disclosed.

While for convenience I have shown my invention in connection with heel lasting mechanism, yet it is equally applicable to toe lasting mechanism, such changes only in shape and arrangement of parts being necessary as would readily suggest themselves to those familiar with lasting machines and skilled in the art.

Having fully described my invention, what I claim and desire to secure by Letters Patent is:—

1. In a lasting machine, the combination with end wipers and means for operating the wipers; of an end embracing clasp mounted for actuation independently of the wipers, and end supports for the clasp; combined with operating levers swinging in a plane substantially parallel with the plane of movement of the wipers for moving the end supports together and relatively to the wipers, and fulcra for said levers which are normally stationary during the actuation of the levers and which extend substantially perpendicularly to the plane of the wipers and are located relatively to the median line of the machine to direct movement of the clasp ends toward the opposite end of the last when the clasp is closed and reversely when the clasp is opened.

2. In a lasting machine, a normally open end clasp having movable ends to open and close about the end of a last, means coöperating with said movable clasp ends and directing movement of the latter about axes located at opposite sides of the middle line of the clasp from the sides on which their respective clasp ends are located, and means to press said clasp ends to and about said last end.

3. In a lasting machine, a normally open end clasp having movable ends to open and close about the end of a last, levers coöperating with said movable clasp ends and directing movement of the latter about axes located at opposite sides of the middle line of the clasp from the sides on which their respective clasp ends are located, and means to press said clasp ends to and about said last end.

4. In a lasting machine, a normally open end clasp having movable ends to open and close about the end of a last, and levers connected respectively with the ends of said clasp and crossing between their respective fulcra and their ends connected with the clasp, to operate said clasp ends.

5. In a lasting machine, an end clasp having movable ends to open and close about the end of a last, a support for said clasp, and levers connected at one of their ends with the free ends of said clasp and fulcrumed remotely from the said clasp, lasting devices and actuating means therefor arranged vertically between the said clasp and the fulcra of the said levers.

6. In a lasting machine, an end clasp having movable ends to open and close about the end of a last, a head carrying the said clasp, and levers connected at one of their ends with the free ends of said clasp and having their opposite ends fulcrumed at or near that end of said head which is opposite that at which the clasp is located, lasting devices and actuating means therefor arranged vertically between the said clasp and the fulcra of the said levers.

7. In a lasting machine, an end clasp having movable ends to open and close about the end of a last, combined with means to cause movement of the ends of said clasp toward the opposite end of said last during closing of the clasp, and away from said opposite end of the last during opening of the clasp and simultaneously to move the back or closed end of the clasp also toward said opposite end of said last during the closing of the clasp, and in an opposite direction during the opening of the clasp, as described.

8. In a lasting machine, the combination with wipers, of an end clasp supported for actuation independently of the wipers and having movable ends to open and close about the end of a last, combined with means first to press the middle portion of said clasp against the end of the last or shoe thereupon and thereafter to press the movable ends of said clasp toward and against the last or shoe thereupon, said means being constructed and arranged to cause the ends of said clasp to be directed away from the adjacent end of the last and toward the opposite end thereof, as the clasp is closed.

9. In a lasting machine, an end clasp having its free ends movable to open and close about the end of a last, combined with levers coöperating with the said clasp and fulcrumed respectively at opposite sides of the middle line of the clasp from the respective ends of the clasp with which they are connected, the fulcra of the said levers being yielding.

10. A lasting machine comprising movable wipers, a clasp having end portions arranged to open and close about an end of a last, means for actuating the wipers and other means for actuating the end portions of the clasp toward the last for closing the clasp, about axes located to direct said end portions, and forwardly as they are closed about the last.

11. In a lasting machine, a clasp to embrace the end of a last, end pieces with which said clasp is connected, and supporting means for said end pieces, each end piece being adapted to have a curvilinear movement about a center at the inner side of the clasp and independently of the body of the clasp as the clasp adapts itself to the shape of the last.

12. In a lasting machine, lasting devices, a clasp to embrace the end of a last, end pieces formed to apply pressure through the lower and the upper portions of the clasp and supporting means for the said end pieces, said end pieces rolling independently with relation to said supporting means as the clasp adapts itself to the shape of the last.

13. In a lasting machine, lasting devices, and a rolling support therefor, combined with an end clasp to embrace the end of a last, and levers constructed to sustain the ends of said clasp and permit the same to roll thereon, the central portion of said clasp being loosely sustained by said rolling support to operate substantially as described.

14. In a lasting machine, an end clasp, levers, and means connecting the said levers with the ends of said clasp, and permitting a roll of each clasp end with reference to its connected lever about a center located inside of the outer face of the adjacent end of the clasp, for the purpose specified.

15. In a lasting machine, a clasp, levers, and connections between the said levers and the respective ends of said clasp, including a curved guide and coöperating curved slot for each clasp end, whereby each clasp end may roll with reference to its connected lever, as described.

16. In a lasting machine, an end clasp, a support to which the body of the clasp is pivotally connected, and means to sustain the ends of said clasp loosely that the clasp may roll on its support, combined with springs for retaining it in predetermined position.

17. In a lasting machine, an end clasp, means to sustain the ends of said clasp loosely that they may roll on their sustaining means, and springs to retain the said clasp ends normally in predetermined position.

18. In a lasting machine, an end clasp, levers, and connections between the levers and the respective ends of the clasp, including curved guides and correspondingly curved guiding grooves therefor, and springs holding the said curved guides normally in predetermined position in said grooves, as described.

19. In a lasting machine, lasting devices, and actuating means therefor, an end clasp adaptable to last-ends of varying cross-sectional or body configuration, and automatically adjustable connections between said clasp and lasting devices, whereby the clasp on meeting the last acts to shift said lasting devices to meet the swing of the end of the last, whether the latter be a right or a left last, automatic adjustment of said connections enabling said clasp to adapt itself to last ends of varying cross sectional or body configurations without impairing the swing adjustment of said lasting devices by said clasp.

20. In a lasting machine, lasting devices, and actuating means therefor, an end clasp adaptable to last-ends of varying cross-sectional or body configuration, and automatically adjustable yielding connections between said clasp and end lasting devices whereby the clasp on meeting the last acts to shift said lasting devices to meet the swing of the end of the last, whether the latter be a right or a left last, automatic adjustment of said connections enabling said clasp to adapt itself to last ends of varying cross sectional or body configurations without impairing the swing adjustment of said lasting devices by said clasp.

21. In a lasting machine, lasting devices to engage and lay the upper, actuating means for said lasting devices, an end clasp to embrace the end of a last, connections between said clasp and said actuating means for closing the former by the latter, said connections being made automatically adjustable whereby the said clasp may vary in its alined position, determined by the configuration of the body of the last, without changing the position and operation of said lasting devices.

22. In a lasting machine, lasting devices to engage and lay the upper, actuating means for said lasting devices, an end clasp to embrace the end of a last, connections between the said clasp and the said lasting devices and actuating means whereby said clasp on meeting the end of a last operates to shift said lasting devices to meet the swing of that end of the last, and whereby said actuating means may act to press said clasp about said last, said connections being automatically adjustable to enable said clasp to adapt itself to last ends of varying cross sectional or body configurations without impairing the swing adjustment of said lasting devices by said clasp or the operation of said lasting devices by said actuating means.

23. In a lasting machine, an end embracing clasp, clasp closing levers connected with the ends of the clasp and provided with cam faces, end lasting plates, and plate actuating means, which include other levers and which coöperate with said cam faces, for adjusting the lasting plates from the clasp in accordance with the contour of the portion of the last embraced by the clasp.

24. In a lasting machine, a flexible clasp adapted to embrace the end of a last, end lasting devices, levers controlled as to position by the position of the ends of the clasp when closed about a last and instrumental in adjusting the lasting devices into substantial alinement with the clasp, and means, rendered operative automatically when the clasp is closed about a crooked last, for causing the lasting devices to be adjusted to a different position from that indicated by the position of the clasp.

25. In a lasting machine, an end clasp adapted to embrace a last, end lasting devices, and levers controlled as to position by the position of the ends of the clasp when closed about a last and instrumental in positioning the lasting devices for adapting said devices to the swing of the last, combined with means for causing the lasting devices to be positioned at variance with the position indicated by said clasp and levers.

26. In a lasting machine, the combination with a clasp for embracing the end of a last and lasting devices adapted to be positioned in substantial alinement with the portion of the last embraced by the clasp, of connections between the clasp and lasting devices for positioning the latter, said connections comprising means automatically rendered operative when the clasp is closed about a crooked last for effecting a positioning movement of the lasting devices different from that indicated by the clasp.

27. In a lasting machine, the combination with a clasp adapted to embrace the end of a last, lasting devices having the capacity for right and left adjustment to meet the swing of the end of a last, connections between the said clasp and lasting devices, whereby swinging of the clasp to meet the swing of the last automatically swings the said lasting devices, said connections including normally balanced springs, and means automatically to disturb the balance of said springs to cause the latter to position said lasting devices at variance with the position indicated by said clasp.

28. In a lasting machine, a clasp, lasting devices having a right and left adjustment to meet the swing of a last, connections between the said clasp and lasting devices whereby adjustment of the clasp to the swing of a last causes automatic adjustment of the lasting devices also to the swing of that last, said connections including normally balanced or equalized parts, and means controlled by the fullness of a last at the side thereof to disturb the balance or equalization of said parts, whereby the latter, in again assuming balanced or equalized condition, automatically vary the swing of said lasting devices with reference to the swing indicated by said clasp.

29. In a lasting machine, lasting devices, means to actuate them to lay the upper on the last, a clasp the ends of which are adapted to close about the end of a last and to move longitudinally relatively to the last and relatively to one another, and to move in a curvilinear path about a center located at the inner side of the clasp as the configuration of the sides of the last at its end varies, and means controlled by the position of the ends of the clasp while embracing the end of any given last to change the position of the lasting devices to conform to the swing of that last.

30. In a lasting machine, lasting devices, a clasp the ends of which are adapted to close about the end of a last and to move longitudinally relatively to the last and to one another, and means governed by the longitudinal positions of the ends of the clasp while embracing the end of a last for positioning the lasting devices to conform to the swing of the bottom of that last.

31. In a lasting machine, a clasp, levers connected with the ends thereof, lasting devices, connections between the same and said levers, whereby swinging of the clasp operates through said levers automatically to swing said lasting devices, said connections including cam surfaces, whereby variations in the cross section of the body of a last automatically vary the swing adjustment of the lasting devices with reference to that of said clasp.

32. A lasting machine, containing end lasting devices constructed and arranged to permit right and left automatic adjustment to meet variations in the swing of the ends of different lasts, and actuating means for said lasting devices, combined with positive locking means to lock said lasting devices automatically in their right and left adjusted position.

33. In a machine for lasting boots and shoes, end lasting devices, a clasp adapted to embrace the end of a last, mechanism intermediate said clasp and the end lasting devices and coöperating therewith to aline said end lasting devices relatively to the clasp and last, and means automatically and positively to lock said clasp and end lasting devices in their relative alined positions.

34. In a lasting machine, right and left adjustable end lasting mechanism including forwardly moving lasting devices, means to actuate the latter, and a locking device having a forward and back movement with said lasting devices to lock the latter automatically in right and left adjusted position.

35. In a lasting machine, a chain, a flexible clasp carried thereby, levers each having a yielding fulcrum and supporting the opposite ends of said chain, means to move said levers to cause the central part of said clasp to meet firmly the end of the last, the said fulcra thereafter yielding while the levers complete their closing movement to fit the clasp to the sides of the last.

36. In a lasting machine, end lasting devices automatically adjustable to meet the right and left swing of lasts, and means coöperating with the side of a last to determine such automatic adjustment of said lasting devices, said means being constructed and arranged for automatically varying the right and left adjustment of said lasting devices according to the peripheral variation between the bottom of the last and the body section thereof above the bottom, for the purpose specified.

37. In a lasting machine, an end clasp, and means for sustaining the opposite ends of said clasp constructed and arranged to permit each end portion of the clasp to be moved about a center located between the ends to enable the clasp to adapt itself to the shape of the last, said machine having provision for yieldingly closing the clasp to cause it to embrace the end of the last, and causing said end portions so to move into clamping engagement with the sides of the last at the lower portions of the clasp ends.

38. In a lasting machine, a flexible end clasp, means to sustain its opposite ends, said means being connected with the clasp ends to permit them to roll thereon that the sides of the clasp may adapt themselves to the configuration of the ends of the last, means acting to close said ends and cause the clasp to embrace the end of the last, and a yielding connection between the clasp ends and the clasp actuating means.

39. In a lasting machine, a clasp to embrace the end of the last, end pieces connected with said clasp, supporting means with relation to which said end pieces are free to slide automatically in the direction of the depth of the last from its bottom to the comb thereof, to thereby adapt the clasp to the configuration of the sides of the last as the clasp is made to embrace the last snugly.

40. In a lasting machine, a clasp to embrace the end of a last, end pieces connected with the opposite ends of said clasp, and crossed levers adapted to guide and sustain said end pieces and direct each of said end pieces independently in their movement as the clasp is made to embrace the last.

41. In a lasting machine, a flexible clasp having between its ends a projecting stud, separate end pieces upon which the opposite ends of said clasp are pivoted, means movable laterally from and toward the last and adapted to sustain said end pieces that they may move bodily in the direction of the depth of the last, and a support to receive said stud and permit said clasp to tip about the stud as the end pieces move on their sustaining means during the fitting of the end pieces to the sides of the end portion of the last.

42. In a lasting machine, a plate having a socket, a clasp having connected with it between its ends a stud entering said socket loosely and free to turn therein, end pieces connected with said clasp at its ends, levers constructed to sustain said end pieces, and permit sliding movement thereof in the direction of the depth of the last whereby the clasp is enabled to adapt itself to lasts varying in shape at their sides and ends.

43. In a lasting machine, a flexible end clasp, means for sustaining its opposite free ends, and means for sustaining its closed end, said sustaining means being constructed and arranged to permit the free ends of the clasp to roll or twist with relation to each other about a center located approximately midway of the depth of the clasp to cause the end portions of the clasp to conform to the different shapes of the opposite sides of a last when the end portions are forced against the shoe, and means for so forcing said end portions of the clasp into shoe clamping position.

44. In a lasting machine, a flexible end clasp, means for sustaining its opposite free ends, and means for sustaining its closed end, said sustaining means being constructed and arranged to permit the closed end of the clasp to roll or twist and to permit the free ends of the clasp to roll or twist independently to enable different portions of the clasp to conform to the shape of the surfaces of the last engaged thereby.

45. In a lasting machine, a plate, a chain having substantially midway of its length a swiveled shank engaging loosely said plate, end pieces connected with said chain, and levers to sustain said end pieces and arranged to cause the end portions of the chain to roll and thereby adapt the chain to the tapered or curved sides of the last.

46. In a machine of the class described, a clasp to embrace the end of the last, and means to sustain the free ends of said clasp whereby as the clasp is closed on the last its ends are compelled to roll on the sustaining means and adapt themselves to the configuration of inclined sides of the last.

47. In a lasting machine, the combination with a clasp for embracing the end of a last, of means for sustaining the clasp, and a sliding connection between said means and the free ends of the clasp so constructed that when the clasp is closed to embrace the last said ends may roll independently to adapt the clasp to the configuration of the last.

48. A lasting machine comprising lasting devices, a rolling support therefor mounted to permit said lasting devices to roll in the arc of a circle transversely of the last, an end embracing clasp, means for sustaining the end portions of said clasp which is arranged to compel rolling movements of the clasp ends independently of said support for the lasting devices when the clasp ends are closed against a last having inclined sides, and means for closing the clasp ends against the sides of the last.

49. In a lasting machine, a clasp having movable end portions to open and close about the end of a last, levers each having connection at one end with an end of the clasp, and means for actuating said levers, the fulcra of the levers being so located as to cause the ends connected with the clasp to move the said clasp ends forwardly as well as inwardly when said levers are actuated for closing the clasp about the last.

50. In a lasting machine, the combination with a clasp for embracing the end of a last, of means for supporting the ends of the clasp and closing the clasp, said supporting means being arranged to move the ends of the clasp forwardly as said ends are closed about the last and to permit the clasp to yield under abnormal resistance to such forward movement.

51. In a lasting machine, a clasp for embracing the end of a last, and means for closing said clasp about the last, said closing means comprising oppositely disposed levers, a spring connecting the upper ends of said levers for pressing them normally toward the clasp to close the same, and means having connection with the other arms of said levers for releasing the clasp.

52. In a lasting machine, a clasp for embracing the end of a last, and means for closing said clasp, said closing means comprising oppositely disposed levers, a spring connecting the upper arms of said levers for pressing them toward the clasp, second levers independently adjustable with relation to the first-mentioned levers for varying the force exerted by the latter upon the two ends of the clasp, and means connected with the lower arms of said first-mentioned levers for moving them to release the clasp.

53. In a lasting machine, the combination with a clasp for embracing the end of a last, mechanism by which the clasp may be positioned lengthwise of the last to embrace the shoe, of means arranged to act on the end portions of the clasp for closing the same about the last, and other means for further closing the clasp.

54. A lasting machine comprising wipers, an independently mounted clasp for embracing the end of a last, and means arranged to act on the end portions of the clasp for closing the same about the last, while the last and the clasp as a whole are longitudinally stationary relatively, said machine having provision for actuating the end portions of the clasp forwardly as they are closed.

55. In a lasting machine, the combination with a clasp for embracing the end of a last, lasting devices for laying an upper over the last, and connections between the clasp and the lasting devices whereby as the clasp is closed about the last the lasting devices are adjusted into alinement with the last, of means for closing the clasp about the last and adjusting the lasting devices, and additional means for actuating the clasp ends against the sides of the shoe.

56. In a lasting machine, the combination with means for supporting a last, of a clasp for embracing an end of the last, means for moving the clasp into operative relation to the last, additional means arranged to actuate the end portions of the clasp for closing the same about the last, and manually controlled means for further closing the clasp about the last.

57. In a lasting machine, the combination with an end clasp adapted to open to receive a last and to be closed for embracing the last, of yielding means connected with the end portions of the clasp to move them in one direction and other means operatively connected with the end portions of the clasp for reversely moving the clasp.

58. In a lasting machine, the combination with an end clasp adapted to open to receive a last and to be closed for embracing the last, of levers adapted to have operative engagement with the opposite end portions of the clasp, a spring connecting the levers to actuate them for moving the end portions of the clasp in one direction, and devices operatively connected with the levers to rock them in a reverse direction for relieving pressure upon the end portions of the clasp.

59. In a lasting machine, the combination with an end clasp adapted to open to receive a last and to be closed for embracing the last, of two separate means arranged to be used independently for closing the end portions of the clasp against the sides of the last.

60. In a lasting machine, the combination with a clasp for embracing the end of a last, of means independent of the last for actuating the clasp to close the end portions thereof against the sides of the last, and manually controlled means for further closing the clasp.

61. In a lasting machine, an end embracing band, supports for the ends of the band, and connections between said supports and the band arranged to permit a movement of the end portions of the band independently of one another about centers located at their inner sides.

62. In a lasting machine, an end embracing band, supports for the ends of the band, and connections between said supports and the end portions of the band arranged to permit said end portions to move relatively to their supports in paths curved inwardly toward the last.

63. In a lasting machine the combination with wiper plates and operating means therefor, of an independently operable end pad, and means controlled by the movement of said operating means for acting upon said pad.

64. The combination with a lasting pad, of movably sustained end supports for said pad, supporting means for said end supports mounted for movement about relatively fixed axes toward and from said pad, and means acting through said supporting means to simultaneously advance said end supports and move them toward or from the pad.

65. A lasting machine having, in combination, a flexible end lasting pad conformable to the end of a shoe, pad presenting means, end wipers, and additional means for simultaneously moving the end wipers and lasting pad for lasting the upper.

66. A lasting machine having, in combination, an end lasting pad and end wipers, both normally in inoperative position, pad positioning means, combined pad operating and wiper positioning means, and wiper operating means.

67. The combination with a lasting pad, of movably sustained end supports for said pad, bars for carrying said end supports, pivotal means supporting said bars from a longitudinally fixed part of the machine, for movement relatively to one another about separate axes, and means for moving said bars to carry the ends of the pad inwardly and longitudinally of the last.

68. The combination with a lasting pad, of movably sustained end supports, bars normally in retracted position and movable about axes which are relatively fixed in a transverse direction for carrying said end supports, and means for swinging said bars toward the center of the last and simultaneously advancing their ends longitudinally of the last.

69. A lasting machine having, in combination, end wipers and operating means therefor, an end lasting pad, movably sustained end supports for said pad, bars for carrying said end supports, transversely fixed pivotal supports for said bars, and means independent of said operating means for moving said bars to carry the ends of the pad inwardly and longitudinally of the last.

70. In a machine of the class described, a normally open, heel-shaped form having movable sides; levers, each connected at one end to one of the sides of the form, each of said lever ends being movable about an axis located upon the opposite side of the middle line of the form from its respective end; and means for pressing the sides of the form toward each other.

71. In a machine of the class described, a normally open, heel-shaped form having movable sides; levers, each connected at one end to one of the side sections of the form and means for actuating the levers, the fulcra of the levers being so located as to cause the ends connected to the sides of the form to move said sides forwardly as well as inwardly when the levers are actuated to close the form about the work.

In testimony whereof, I have signed my name to this specification, in the presence of two subscribing witnesses.

MATTHIAS BROCK.

Witnesses:
FREDERICK L. EMERY,
MARGARET A. DUNN.

Copies of this patent may be obtained for five cents each, by addressing the "Commissioner of Patents, Washington, D. C."